(12) United States Patent
Kimmig et al.

(10) Patent No.: US 7,762,598 B2
(45) Date of Patent: Jul. 27, 2010

(54) DEVICE FOR HANDLING ROD-SHAPED OBJECTS

(75) Inventors: Erwin Kimmig, Kappelrodeck (DE); Siegfried Lasch, Rheinau-Freistett (DE)

(73) Assignee: KUKA Roboter GmbH, Augsburg (DE)

( * ) Notice: Subject to any disclaimer, the term of this patent is extended or adjusted under 35 U.S.C. 154(b) by 500 days.

(21) Appl. No.: 11/574,930

(22) PCT Filed: Jul. 29, 2005

(86) PCT No.: PCT/EP2005/008236
§ 371 (c)(1),
(2), (4) Date: Mar. 8, 2007

(87) PCT Pub. No.: WO2006/027053
PCT Pub. Date: Mar. 16, 2006

(65) Prior Publication Data
US 2008/0031719 A1    Feb. 7, 2008

(30) Foreign Application Priority Data
Sep. 10, 2004   (DE) ................... 10 2004 044 293

(51) Int. Cl.
*B66C 1/42* (2006.01)
(52) U.S. Cl. .......... 294/87.1; 294/87.2; 294/81.52; 414/790.2
(58) Field of Classification Search ............ 294/87.1, 294/87.2, 87.24, 87.26, 67.32, 81.52; 414/790, 414/790.2, 795.7, 788.2
See application file for complete search history.

(56) References Cited

U.S. PATENT DOCUMENTS

| | | | | |
|---|---|---|---|---|
| 3,559,371 A | * | 2/1971 | Borrowman | 53/390 |
| 4,384,739 A | * | 5/1983 | Gustavsson et al. | 294/87.1 |
| 4,975,018 A | * | 12/1990 | Langenbacher et al. | 198/750.11 |
| 5,069,019 A | * | 12/1991 | Lodewegen | 53/443 |
| 5,169,271 A | * | 12/1992 | Yamashita | 414/27 |
| 5,273,167 A | | 12/1993 | Haas et al. | |
| 6,290,276 B1 | * | 9/2001 | Sherwin | 294/87.1 |
| 6,305,728 B1 | * | 10/2001 | Holter et al. | 294/3 |
| 6,439,828 B1 | | 8/2002 | Lauermann | |
| 6,655,903 B2 | * | 12/2003 | Kohler | 414/802 |
| 6,851,918 B2 | * | 2/2005 | Padovani | 414/790 |

FOREIGN PATENT DOCUMENTS

| | | |
|---|---|---|
| DE | 34 24 233 | 1/1986 |
| DE | 35 41 900 A1 | 6/1987 |
| DE | 37 41 257 A1 | 6/1989 |
| DE | 40 30 215 A1 | 3/1992 |
| DE | 103 60 160 A1 | 7/2005 |
| EP | 0 167 138 A2 | 1/1986 |
| EP | 0 224 678 A1 | 6/1987 |

* cited by examiner

*Primary Examiner*—Dean J Kramer
(74) *Attorney, Agent, or Firm*—McGlew and Tuttle, P.C.

(57) ABSTRACT

To improve the handling, such as the gripping and displacement, of essentially rod-shaped objects, especially bars of articles that are stacked into one another in such a way that they can be separated, such as plastic cups, the present invention proposes a device with a plurality of first holding rods with essentially hook-like end pieces for extending under the rod-shaped objects. The device according to the present invention is characterized in that the end pieces can be moved under the objects and for releasing same by a motion into a plane extending at right angles to the direction of extension of the first holding rods.

29 Claims, 8 Drawing Sheets

DEVICE FOR HANDLING ROD-SHAPED OBJECTS

The present invention pertains to a device for handling essentially rod-shaped objects, especially bars of articles stacked in one another in such a way that they can be separated, such as plastic cups, with a plurality of first holding rods with essentially hook-like end pieces for extending under the rod-shaped objects.

Cups made of deep-drawn plastic films are frequently used to hold foods in the dairy industry, such as yogurt, milk beverages or the like. The aforementioned cups are usually designed such that they can be stacked one inside the other. The rows of cups nested in one another in this manner will hereinafter be called bars of cups.

After they have been manufactured in a corresponding deep-drawing machine, the cups are fed, in practice, in the form of bars of cups, directly to a machine in which further processing is performed, such as a decorating machine for printing on the cups, and are subsequently packed in loading aids, especially boxes, for transport, for example, to a filling machine. Packing in the said loading aids immediately after manufacture is also possible in practice.

The loading operations, i.e., the packing of bars of cups in a box and their unpacking from a box, are carried out in conjunction with a loading aid manually or in a partially automated form in prior-art devices. The plastic cups, which are made, for example, from polypropylene (PP) or polystyrene (PS), are manufactured, as a rule, in a thermal deep-drawing process. An extruded film is fed for this purpose to the deep-drawing machine and heated in same, subsequently preformed by prestretching units and finally pressed into a mold, for example, by means of compressed air, cooled, and cut out. The finished, still hot and easily deformable cups are stacked in the deep-drawing machine (stacking of a plurality of cups in one another to form a bar of cups) and subsequently they are either sent automatically to a machine, in which further processing is carried out, for decorating (printing), or packed manually in a box. For hygienic reasons, the box frequently has a lining on the inside, e.g., in the form of a plastic bag.

Currently existing devices have several drawbacks. Thus, no device has been known so far with which all the process steps to be carried out during the said handling of rod-shaped objects, especially the deposition in a loading aid or removal from a loading aid, could be carried out fully automatically. Furthermore, a time-consuming and expensive changeover of various machine components is necessary in the prior-art devices for automatically packing bars of cups in loading aids in case of a changeover to a new cup diameter or to a new type of cup, as a result of which the flexibility in terms of variants is, on the whole, reduced. Moreover, most deep-drawing machines produce not only an individual cup per deep-drawing cycle, but a plurality of individual cups according to a defined pattern simultaneously. This [pattern] is usually two-dimensional and is called cavity. Since the transfer of the cups from the deep-drawing machine to the next handling or processing step, for example, decoration or packing, takes place, in general, in the form of bars of cups, i.e., one-dimensionally, a corresponding device, by which a cavity can be converted into individual bars of cups, must be integrated in one of the deep-drawing machines. As a result, the corresponding deep-drawing machines are more complicated and their manufacture and maintenance are correspondingly more expensive.

In addition, the bars of cups are passed on in prior-art deep-drawing machines, as a rule, lying on their sides. Due to the bars of cups being pushed further laterally, forces, such as the force of gravity and frictional forces, act on a sealing edge of the cup, which adversely affects, in principle, the quality of manufacture of the cup, especially because the cups still have a temperature of 80° C. after the deep-drawing and are therefore especially easily deformable. The filling and sealing of a yogurt cup imposes extremely high requirements on the said sealing edge in terms of tolerance, roundness and angular position in relation to an axis of the cup, so that this drawback of the state of the art is especially serious.

Finally, it is not possible in prior-art devices especially for packing bars of cups in loading aids such as boxes or the like to set a packing pattern in the box such that the highest possible packing density, i.e., a maximum possible number of bars of cups per box, can be reached.

A device for handling, especially removing, bars of cups, which are delivered lying in an open transport container, is known from DE 40 30 215 C2. The use of a suction member gripping a bar of cups on the long side thereof is disclosed for this. As was stated above, the fact that optimal packing density is not reached, as a rule, due to the box being filled horizontally with bars of cups, can be considered to be especially disadvantageous. Because of the frictional connection between the cups and the suction member as well as because of the own weight of the bar of cups, by which the lower layers in the box are greatly loaded, the prior-art device is not suitable especially for handling still warm, deformable cups. Moreover, the suction member according to DE 40 30 215 C2 can be used for bars of cups of a fixed length only.

DE 35 41 900 A1 discloses a process and a device for displacing bars of equal size layer by layer, wherein a gripper surrounds with a gripping strap a plurality of bars of cups arranged in parallel in a positive-locking and non-positive manner and deposits same lying in boxes. Thus, essentially the same drawbacks arise as were mentioned above in connection with DE 40 30 215 C2.

A gripping device, especially for lying stacks of plastic cups inserted into one another, is known from DE 37 41 257 A1. The bars of cups are arranged in loading aids lying one on top of another in this case as well. Moreover, the disclosed gripping device has at least one tongs part and one contact part, which cooperates with same and by which the stack formed by insertion is surrounded on its outer jacket side in the manner of a grappler. The drawbacks mentioned above arise here as well.

DE 34 24 233 C2 shows a device for filling boxes, in which the bars of cups are deposited lying in boxes by means of a gripping means in a manner not described in greater detail. Thus, at least the above-mentioned drawbacks arise here as well.

German patent application 103 60 160.0, which was not yet published at the priority date of the present patent application, describes a process for handling essentially rod-shaped objects, especially bars of articles stacked in one another in such a way that they can be separated, such as plastic cups, during loading operations in conjunction with a loading aid, especially a box, wherein the objects to be handled are made available by a manufacturing or processing machine in a first geometric arrangement. At least some of the objects are gripped here first and a relative arrangement of the objects in relation to one another is subsequently changed. The changed arrangement is subsequently deposited in the loading aid, the object[s] ["die Objekt" in line 17, p. 5 of German original should read "die Objekte"—Tr.Ed.] being arranged standing upright. Furthermore, the said application discloses a device for handling essentially rod-shaped objects, especially bars of articles stacked in one another in such a way that they can be separated, such as plastic cups, after they have been made available at a corresponding manufacturing or processing machine in a first geometric arrangement during loading operations in conjunction with a loading aid, especially a box, the device comprising a first gripping means, which is designed to grip at least some of the objects at an interface with the manufacturing or processing machine and for depositing the objects standing upright. Even though the prior-art process and the prior-art device work satisfactorily, improvements are nevertheless desirable, especially in terms of the device technology.

The basic object of the present invention is to perfect a device of the type mentioned in the introduction such that fully automatic handling of bars of cups becomes possible, wherein the cups are to be handled very gently especially during handling, so that handling of the cups immediately after their manufacture is also possible.

This object is accomplished according to the present invention in a device of the type mentioned in the introduction such that the end pieces can be moved under the objects and for releasing same by a motion into a plane at right angles to the direction of extension of the first holding rods.

The contents of the German patent application 103 60 160.0 cited above are fully integrated in the disclosure content of the present application. In particular, embodiments and contents of the device being described here can be combined with embodiments of the device described in the said German patent application 103 60 160.0 within the framework of the inventive idea of the present application.

Bars of cups can be handled reliably and fully automatically with the device according to the present invention in conjunction with a loading aid that is open on one side only, and the cups are handled very gently. Due to the orientation of the arrangement of the cups according to the present invention, it is, furthermore, possible to optimize the objects or the number of cups that can be accommodated in the loading aid.

The devices according to the present invention may be able to be actuated by an associated handling device, especially a robot according to ISO EN 8372, such as a multiaxial industrial robot. A four-axis or six-axis industrial robot may be preferably provided here. However, it is, of course, also possible to use an industrial robot with another number of axes.

Provisions are made in the present invention, in particular, for the objects to be gripped by means of a first gripping means and being subsequently deposited on associated storage elements of a storage means, the geometric arrangement of the objects being changed during deposition. As a result, there is a first optimization of the arrangement of the objects in a loading aid. The objects can then be deposited directly in the loading means. To guarantee optimal loading and unloading of the storage area, the individual rows of the storage area are advantageously displaceable in the longitudinal direction independently from one another.

Provisions are made in a preferred embodiment of the device according to the present invention for the holding rods in one row each to be mounted rigidly on one of two support plates and for the support plates to be mobile in relation to one another, this motion having at least one component [directed] at right angles to the rows of the holding rods. Since the support plates are mobile in relation to one another, the two rows of holding rods can be moved apart and brought together by means of a linear drive, so that—if the holding rods have a corresponding design—the end pieces of the holding rods can be switched or changed over between the gripping and release positions by means of the linear drives. Inexpensive manufacture and high reliability are ensured due to the fact that no complicated mimic system is used to actuate the holding rods with end pieces.

Provisions are made in a preferred embodiment of the device according to the present invention for the end pieces to have on their underside a lead-in bevel projecting towards their free end from the area in which they are connected to the holding rods and/or for the end pieces to have an essentially wedge-shaped profile at right angles to the holding rods.

To make possible an optimal guiding of the stack of cups, second holding rods are designed preferably without hook-like end pieces, and they have especially an essentially wedge-shaped cross-sectional profile, as a result of which a satisfactory contact is guaranteed between the stack of cups and the holding rods. The second holding rods may advantageously taper at their end.

Provisions are made in another preferred embodiment of the device according to the present invention for the end pieces to be pivotable with the holding rods holding them about the direction of extension of the holding rods, the end pieces preferably extending diametrically away from the holding rod in two directions and/or a plurality of rows of holding rods with end pieces being able to be moved together. It is possible as a result to provide a device by means of which a two-dimensional arrangement of stacks of cups, a so-called cavity, can be gripped with a single operation.

To hold and align the stack of cups between the holding rods, provisions are preferably made for each adjacent row ["jede benachbarten Reihen" in lines 26-27, p. 8 of German original is a typo for "jede benachbarte Reihe"—Tr.Ed.] of holding rods with end pieces to be able to be moved independently from one another.

Other advantageous embodiments of the present invention are characterized in that one first pivotable holding rod each provided with an end piece is surrounded by four second holding rods, the end piece being especially able to be pivoted out of and into the contour defined by the second holding rods.

Finally, provisions may be made according to an advantageous embodiment for the second holding rods to have centering tips for precentering the rod-shaped objects.

Furthermore, it may be advantageous in a device of the above-mentioned type if the holding rods are formed by members placed one on the other, which are braced with one another by a tensioning element extending through the members.

Other properties and advantages of the present invention appear from the following description of exemplary embodiments with reference to the drawings. In the drawings.

Figure 1:
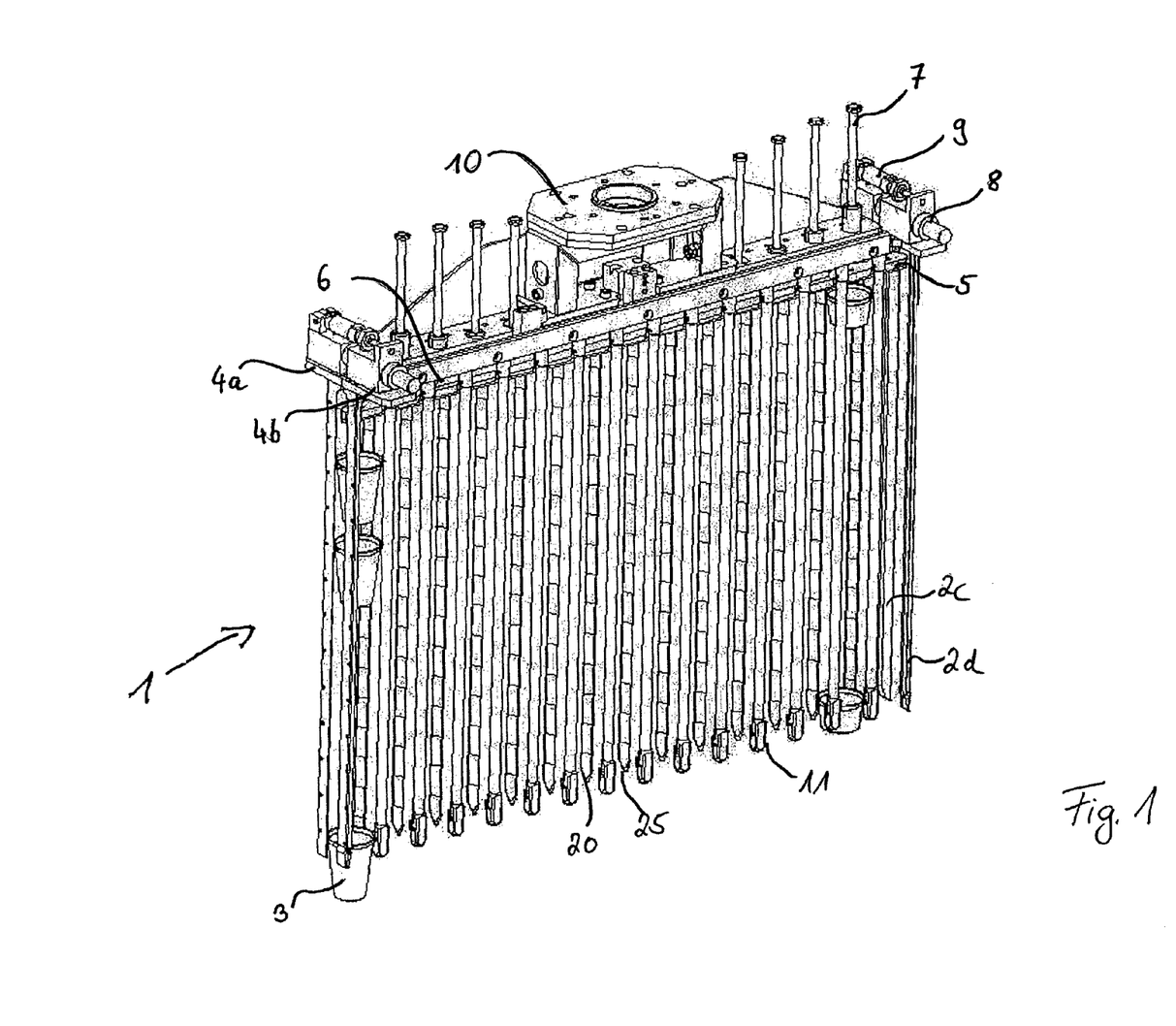
FIGS. 1, 2 show a perspective view each of a preferred embodiment of the device according to the present invention.

The first preferred embodiment of the device according to the present invention for handling and transferring essentially rod-shaped objects, such as a bar 3 of plastic cups stacked one in the other, which embodiment is shown in FIG. 1, is designed in the form of a row gripper 1 and has two base plates 4a and 4b, at which a row of holding rods 2a through 2d each, extending in parallel for holding the bars 3 of cups, is arranged. An ejector weight 5 (cf. especially FIG. 2), which is connected to brackets 7 or mounts via connection plates 6, is located between the two rows of holding rods 2a through 2d. Plain bearings 8 for guiding the base plates 4a, 4b during their relative motion are arranged at the base plates 4a, 4b above the holding rods 2a through 2d. A pneumatic or electric displacing drive 9 is provided to move the base plates 4a, 4b apart and together. The base plate 4a additionally has a mounting means 10 for mounting the row gripper 1 on an automatic handling unit, such as a robot according to ISO EN 8373.

Figure 3A:
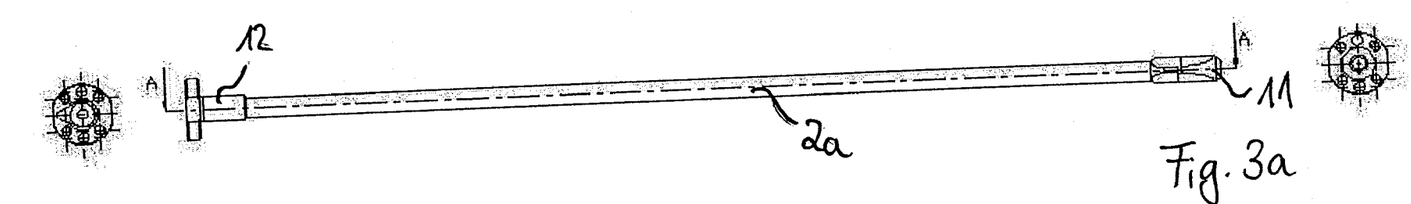
FIGS. 3a-3c show a view each of holding rods of the device according to FIGS. 1 and 2.
Figure 3B:
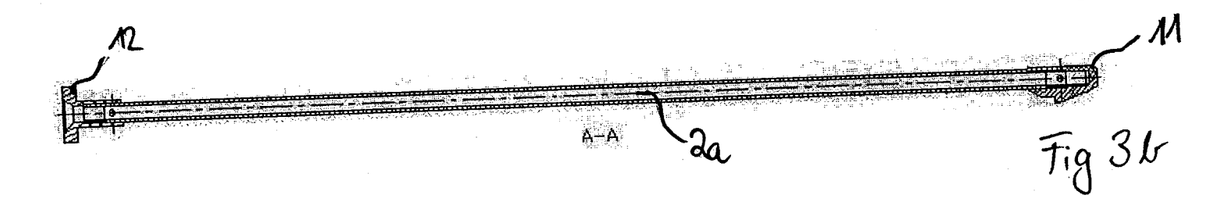
Figure 3C:
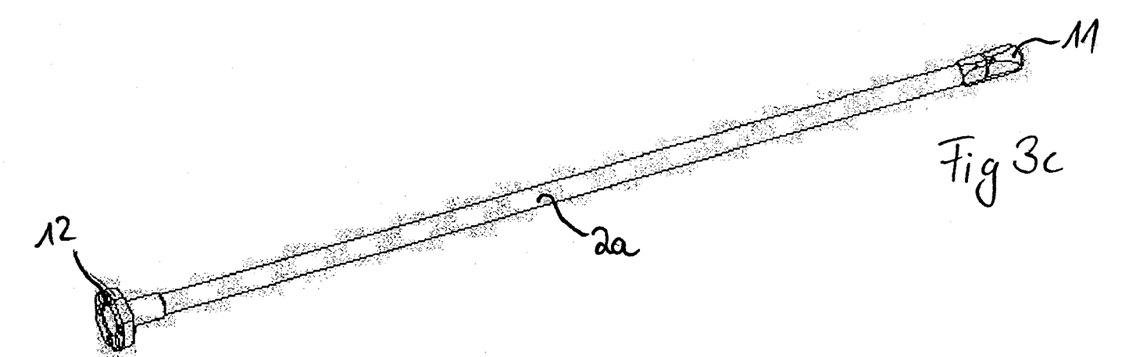

FIGS. 3a through 3c show a detail view each of the holding rods 2a. An end piece 11 at the free, lower end of the holding rods 2a has a hook-like support for extending under the stack 3 of cups at the sealing edge of the lowermost cup. On its underside, the end piece 11 has a bevel projecting from the rod 2a to the free end of the hook, so that it easily finds its way between the stacks of cups. A ring flange 12 for screwing the holding rod 2a to the respective base plate 4a or 4b is located at the other end of a holding rod 2a.

Figure 4A:
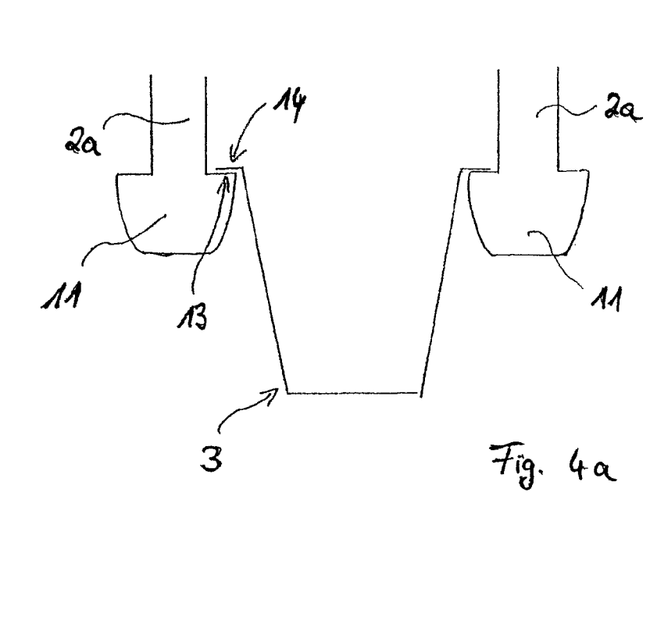
FIGS. 4a, 4b show a detail view each of the device according to FIGS. 2 and 3.
Figure 4B:
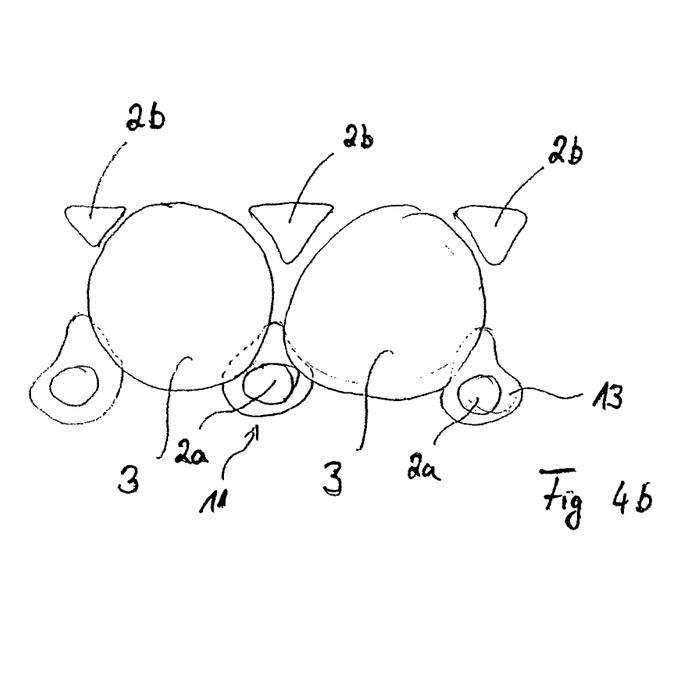

FIG. 4 shows an enlarged view of the bracket of the bars 3 of cups in detail. The sealing edge 14 of the lowermost cup of the bar 3 of cups now lies on the support 13 of the end piece 11 of the holding rod 2a. FIG. 4b shows a section in the areas of the end pieces 11.

Figures 5A, 5B:
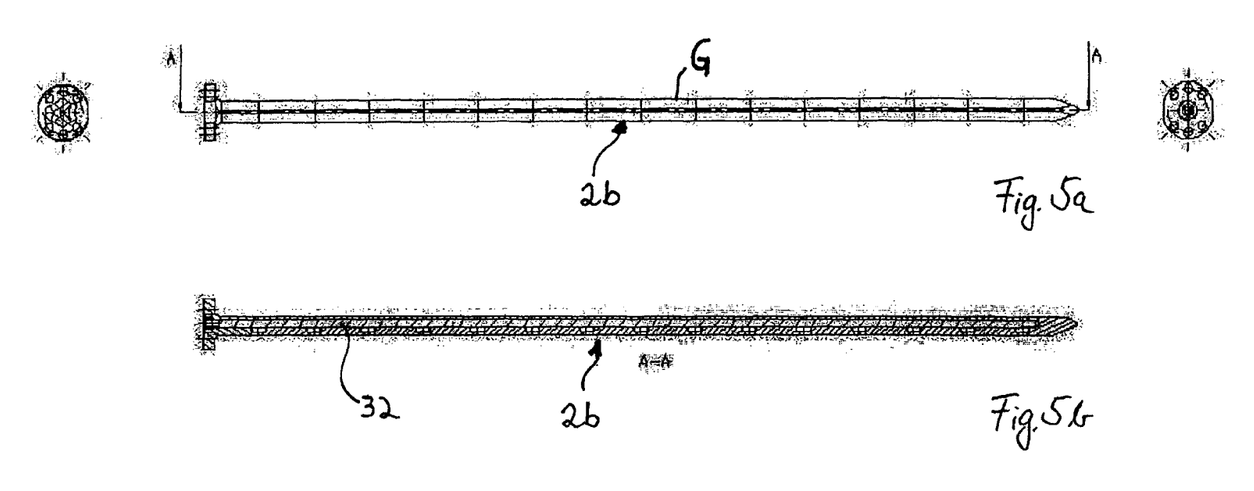
FIGS. 5a-5c show a perspective detail view each of the device according to FIGS. 1 and 2.
Figure 5C:
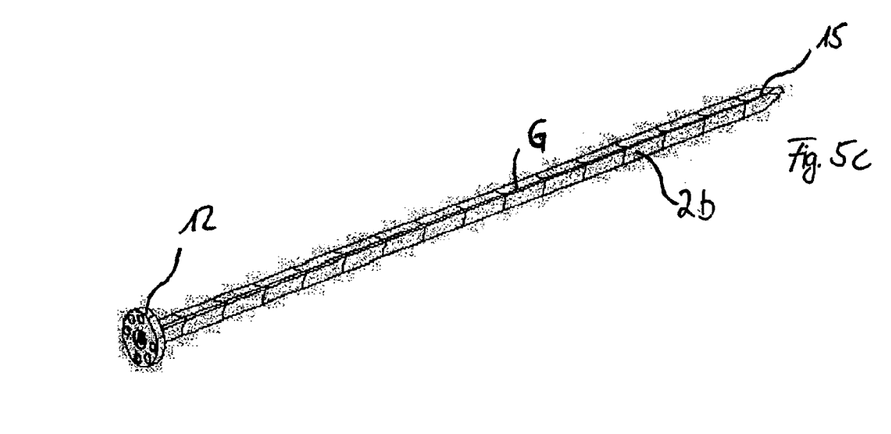

As is apparent from FIG. 5, the holding rods 2b have an essentially triangular profile and taper at their lower or free end 15, which is the right-hand end in FIGS. 5a through 5c, in order to make possible an easier insertion of the bars 3 of cups between the holding rods. At their upper or fastening-side end, which is the left-hand end in FIGS. 5a through 5c, the holding rods 2b as well as the holding rods 2a have ring flanges for mounting on the base plate 4b and 4a, respectively.

It is seen in FIGS. 1, 2, 5a and 5c that the holding rods 2a, 2b are formed by individual members G placed on one another in the direction of extension of the holding rods 2a, 2b. The members G are braced with one another by a tensioning element 32 extending through them, such as preferably a tensioning rod, via abutments arranged at the outer members. High accuracy as regards straight extension as well as high strength and stability of the holding rods 2a, 2b can be achieved in this manner, which could not be achieved with one-piece rods of the length-to-diameter ratio that is necessary here.

Figure 2:
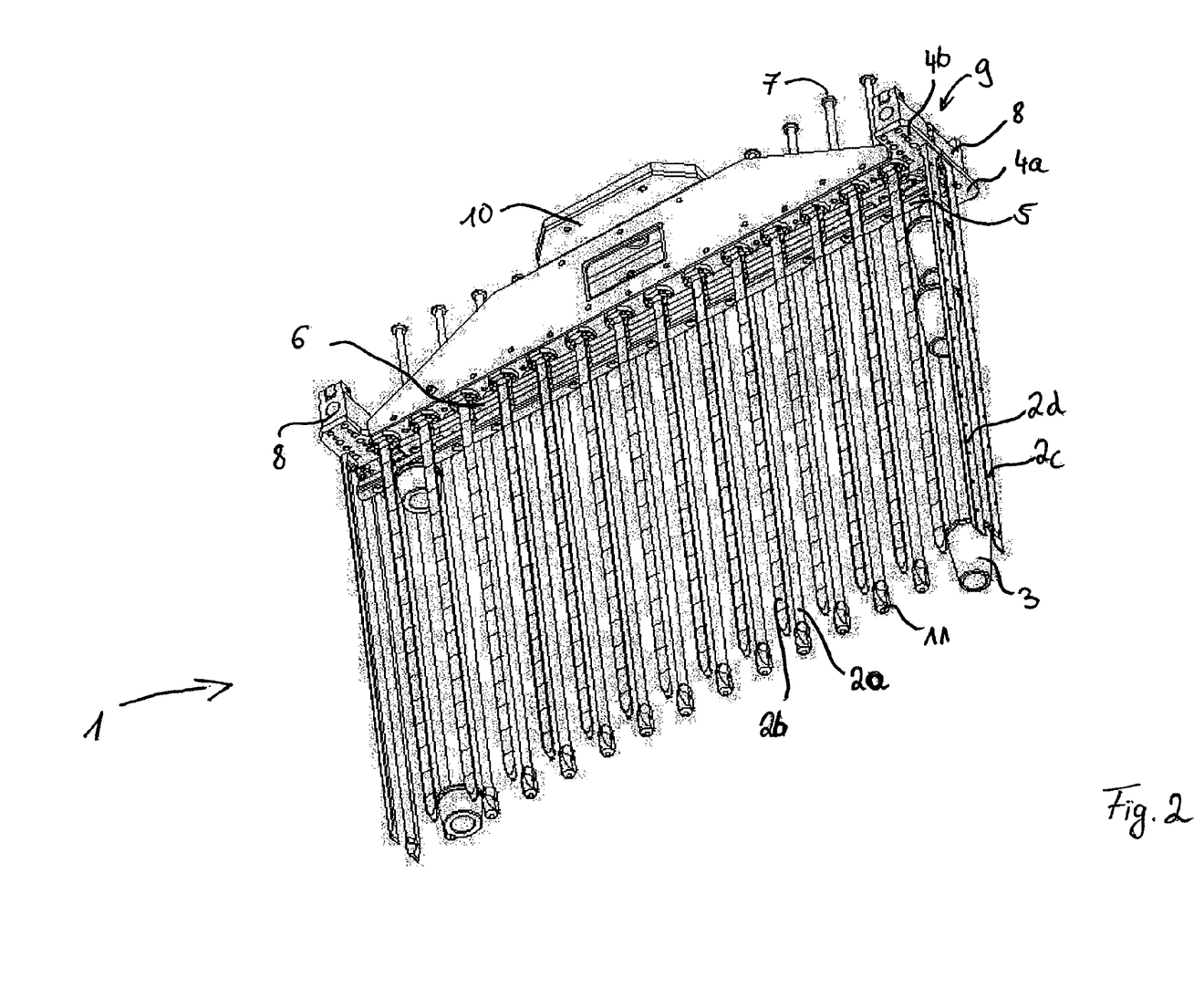

The mode of operation of the device according to the present invention, which was described above, is as follows:

The row gripper 1 is opened by means of the displacing drive 9, i.e., the two rows of holding rods 2a and 2b, respectively, are moved apart. The ejector weight 5 can be located at the lower end of the holding rods 2a through 2d at a short distance above the end pieces 11. The row gripper 1 dips in the open state into the rows of cups comprising the bars 3 of cups. The bars 3 of cups are threaded between the holding rods 2a through 2d because of the tapered ends of the said holding rods 2a through 2d. The ejector weight 5 is now optionally pushed by the bars 3 of cups upward in the direction of the base plate 4a and 4b, respectively, and it optionally pushes the cups deeper into one another. If the row gripper 1 has dipped completely into the rows of cups, the gripper 1 is again closed by means of the displacing drive 9, i.e., the holding rods 2a through 2c are again moved towards each other. The end pieces 11 of the holding rods 2b now dip in between the bars of cups and extend under the sealing edge 14 of the lowermost cup of a bar 3 of cups, which comes to lie on the supports 13 of the end pieces 11 of the holding rods 2b. Since the holding rods 2b prevent the cups from tilting, the stack 3 of cups is thus locked between the holding rods 2a through 2d, even if only the end pieces 11 of two holding rods 2a extend under it and is in contact with the holding rods 2b only without these holding rods extending under it. The row gripper 1 can thus be brought from a robot or the like to a destination site different from the pick-up site. The row gripper 1 is opened here, again by means of the displacing drive 9. The ejector weight 5 pushes the bars 3 of cups out of the holding rods 2a through 2d and the row gripper 1 is again emptied, so that it can be refilled.

Figure 6:
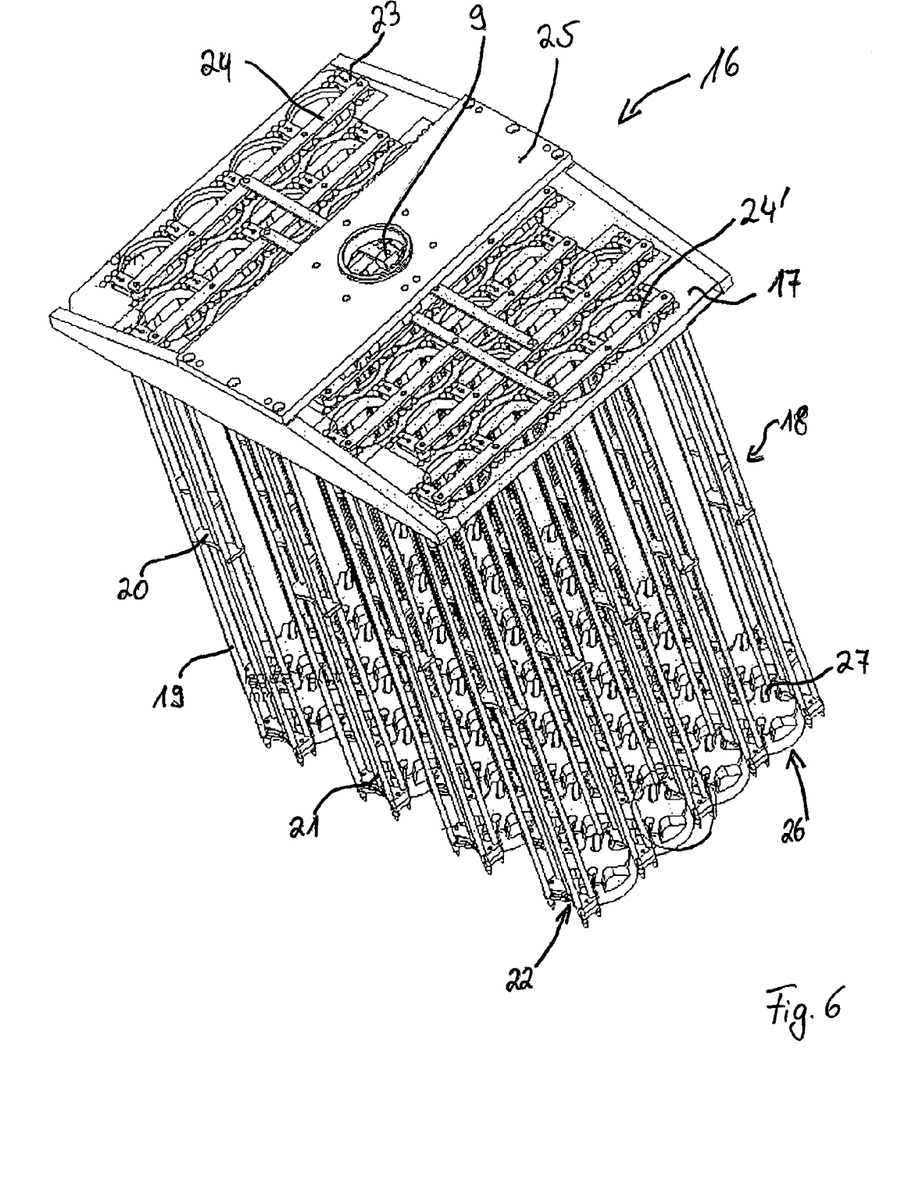
FIG. 6 shows a perspective view of another preferred embodiment of the device according to the present invention.
Figure 7:
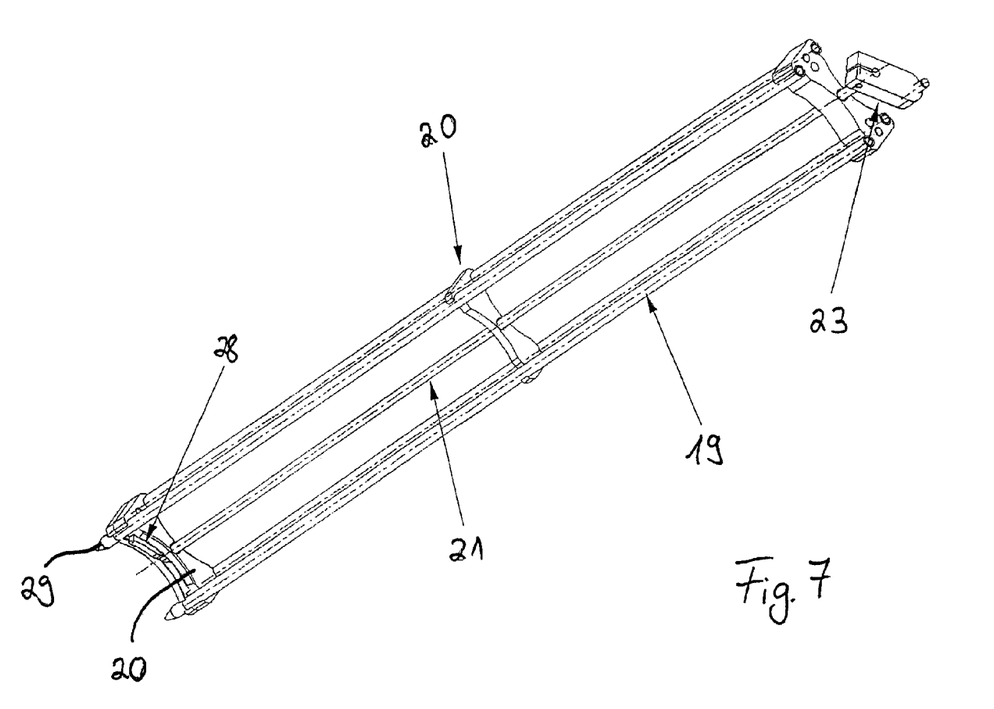
FIG. 7 shows a detail view of a holding module of the device according to FIG. 6.
Figure 8A:
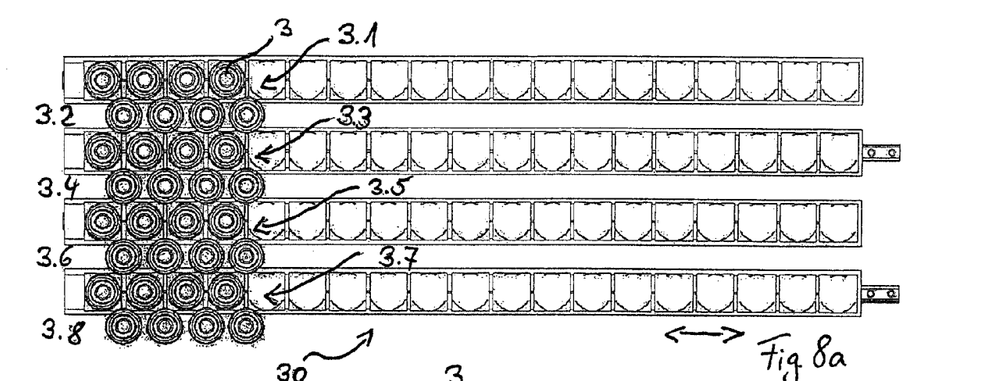
FIGS. 8a-8d show a schematic view of the deposition of objects in the storage means.
Figure 8B:
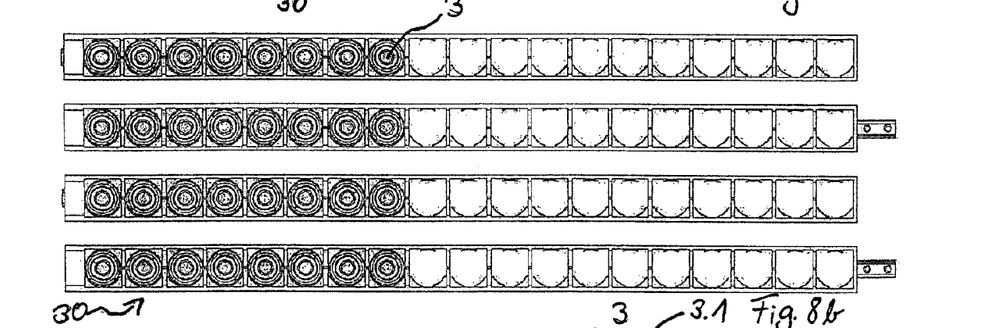
Figure 8C:
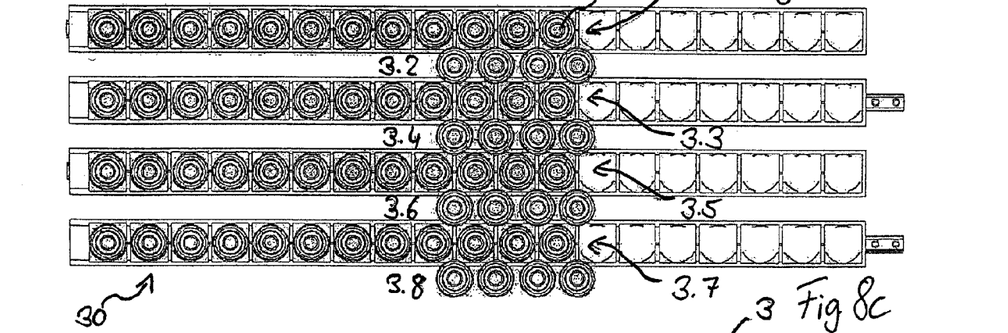
Figure 8D:
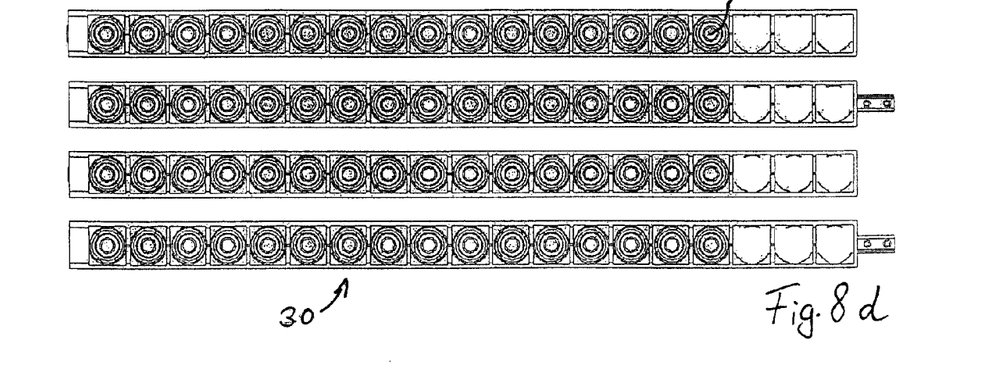

FIG. 6 shows a second embodiment, a so-called cavity gripper 16, of the device according to the present invention. Holder modules 18, which are shown more specifically in FIG. 7, are mounted on a mounting frame 17. These [modules] comprise four (second) holding rods 19, which are connected to one another via reinforcing webs 20. Another (second) holding rod 21 with an end piece 22, which [end piece] is located at the level of the lower end of the holding rods 19, is located between the four holding rods 19. The end piece 22 extends in two directions at right angles from the first holding rod 21, so that it can extend under two adjacent bars 3 of cups. A reversing lever 23 each is located at the upper end of the holding rods 21, and these reversing levers are connected to displacing drives 9 via linkages 24, 24'. The displacing drives 9 are fastened to a mounting plate 25, which is connected to the mounting frame 17 and with which the cavity gripper 16 can be fastened, e.g., to a robot. Adjacent rows of holding modules 18 are arranged offset by half the diameter of a bar of cups in order to make possible a "dense packing." Every other row of first holding rods 21 each is connected to the drive 9 via the respective linkage 24 and 24' and can be actuated by means of same. Adjacent rows of first holding rods 21 can consequently be actuated separately. Ejector modules 26, which are guided via rollers 27 on the second holding rods 19, are located between the holding modules 18. At their free lower ends, the second holding rods 19 have centering tips 29 for precentering the bars 3 of cups.

The mode of operation of the above-described second embodiment of the device according to the present invention is as follows:

The cavity gripper 16 is first opened, i.e., the lever arm 28 is introduced into the contour limited by the—second—holding rods 19; the ejector modules 26 are located at the lower end of the holding modules 18. The cavity gripper 16 is now pulled over a geometric arrangement of bars 3 of cups, which corresponds to the geometric arrangement of the holding modules 18. The bars 3 of cups are precentered via the centering tips 29, so that they slide in between the holding modules 18 without jamming, and they push the ejector modules 26 upwards. If the cup cavity has been completely transferred, the double-armed end pieces 28 arranged at the—first—holding rods 21 are deflected by means of the reversing levers 23 such that they extend under the sealing edges 14 of the lowermost cup of the bars 3 of cups. To deposit the bars 3 of cups, the end pieces 28 of the holding rods 21 are again withdrawn pivotingly, so that the rows 3 of cups can be pushed out completely by means of the ejector modules 26 during the raising of the device. Every other row of the cavity is opened or closed uniformly via a displacing drive 9 in this exemplary embodiment.

FIG. 8 shows the deposition of a cavity of bars 3 of cups. The individual rows of a storage area 30 are displaceable in the longitudinal direction independently from one another in order to guarantee optimal loading and unloading of the storage area with the smallest possible overall storage area size. A geometric arrangement of bars 3 of cups, a so-called cavity, is removed from the manufacturing or processing machine (not shown) by means of a gripper, and the gripper is introduced into the storage area 30. The gripping devices of rows 3.1, 3.3, 3.5 and 3.7 of the cavity of bars 3 of cups are then opened. The corresponding rows of bars 3 of cups can now be ejected from the gripping device. The gripper is subsequently moved further by four rows and the gripping devices of rows 3.2, 3.4, 3.6 and 3.8 are opened (FIG. 8*b*), as a result of which the corresponding bars 3 of cups are ejected. The gripper now brings a new cavity from the processing or manufacturing machine (not shown) and moves same in FIGS. 8*c* and 8*d* in the same manner as in FIGS. 8*a* and 8*b*.

LIST OF REFERENCE NUMBERS

1 Row gripper
2*a*-2*d* Holding rod
3 Bar of cups
4*a*, 4*b* Base plate
5 Ejector weight
6 Connection plate
7 Bracket or mount of the ejector weight
8 Bearing
9 Displacing drive
10 Mounting means
11 End piece with support
12 Ring flange
13 Support
14 Sealing edge
15 Tapered end
16 Cavity gripper
17 Mounting frame
18 Holding module
19 Holding rod
20 Reinforcing web
21 Holding rod
22 End piece
23 Reversing lever
24 Linkage
25 Mounting plate
26 Ejector module
27 Roller
28 End piece
29 Centering tip
30 Storage area

The invention claimed is:

1. A device for handling essentially rod-shaped objects formed by bars of articles, which are stacked in one another in such a way that they can be separated, the device comprising:
a plurality of first holding rods with essentially hook-like end pieces for extending under the rod-shaped objects, wherein said end pieces can be moved under the objects for releasing the objects via a motion into a plane extending at right angles to a direction of extension of said first holding rods;
brackets or mounts;
connection plates;
an ejector weight located between two rows of said first holding rods, said ejector weight being connected to said brackets or mounts via said connection plates; and
a plurality of second holding rods, said second holding rods having no said hook-like end pieces.

2. A device in accordance with claim 1, wherein said first holding rods are mounted rigidly on one of two mounting plates and said mounting plates are movable in relation to one another, wherein a motion of said mounting plates has at least one component at right angles to rows of said first holding rods.

3. A device in accordance with claim 1, wherein said end pieces have, on an underside thereof, a lead-in bevel projecting toward a free end from an area in which said end pieces are connected to said first holding rods.

4. A device in accordance with claim 1, wherein said end pieces have an essentially wedge-shaped profile at right angles to said first holding rods.

5. A device in accordance with claim 1, wherein said second holding rods have an essentially wedge-shaped cross-sectional profile.

6. A device in accordance with claim 1, wherein said second holding rods have a taper at an end thereof.

7. A device in accordance with claim 1, wherein said end pieces can be pivoted with said first holding rods about a direction of extension of said first holding rods.

8. A device in accordance with claim 1, wherein said end pieces extend diametrically away from at least one of said first holding rods in two directions.

9. A device in accordance with claim 1, wherein a plurality of rows of said first holding rods with said end pieces can be moved together.

10. A device for handling essentially rod-shaped objects formed by bars of articles, which are stacked in one another in such a way that they can be separated, the device comprising:
a plurality of first holding rods with essentially hook-like end pieces for extending under the rod-shaped objects, wherein said end pieces can be moved under the objects for releasing the objects via a motion into a plane extending at right angles to a direction of extension of said first holding rods, wherein said plurality of first holding rods are arranged in rows, each adjacent row of said first holding rods with said end pieces being independently movable from one another;
brackets or mounts;
connection plates; and
an ejector weight located between two rows of said first holding rods, said ejector weight being connected to said brackets or mounts via said connection plates.

11. A device in accordance with claim 10, further comprising a plurality of second holding rods, wherein one or more of said first holding rods is pivotable from one position to another position, each of said pivotable first holding rods being provided with at least one of said end pieces, each of said pivotable first hold rods being surrounded by at least four of said second holding rods.

12. A device in accordance with claim 11, wherein said at least one of said end pieces can be pivoted out of a contour defined by said second holding rods and into said contour.

13. A device in accordance with claim 10, further comprising a plurality of second holding rods, said second holding rods having centering tips for precentering the rod-shaped objects.

14. A device in accordance with claim 10, further comprising a plurality of second holding rods, wherein said first holding rods and said second holding rods are formed by members, which are placed on one another and said members are braced with one another by a tensioning element extending through said members.

15. A device for handling essentially rod-shaped objects formed by bars of articles, which are stacked in one another in such a way that they can be separated, the device comprising:
a plurality of first holding rods with essentially hook-like end pieces for extending under the rod-shaped objects, wherein said end pieces can be moved under the objects for releasing the objects via a motion into a plane extending at right angles to a direction of extension of said first holding rods;

brackets or mounts;
connection plates;
an ejector weight located between two rows of said first holding rods, said ejector weight being connected to said brackets or mounts via said connection plates; and
a plurality of second holding rods, wherein one or more of said first holding rods is pivotable from one position to another position, each of said pivotable first holding rods being provided with at least one of said end pieces, each of said pivotable first hold rods being surrounded by at least four of said second holding rods.

16. A device in accordance with claim 15, wherein said at least one of said end pieces can be pivoted out of a contour defined by said second holding rods and into said contour.

17. A device in accordance with claim 16, wherein said second holding rods have centering tips for precentering the rod-shaped objects.

18. A device in accordance with claim 15, wherein said second holding rods have centering tips for precentering the rod-shaped objects.

19. A device in accordance with claim 15, wherein said first holding rods and said second holding rods are formed by members, which are placed on one another and said members are braced with one another by a tensioning element extending through said members.

20. A device for handling essentially rod-shaped objects formed by bars of articles, which are stacked in one another in such a way that they can be separated, the device comprising:
a plurality of first holding rods with essentially hook-like end pieces for extending under the rod-shaped objects, wherein said end pieces can be moved under the objects for releasing the objects via a motion into a plane extending at right angles to a direction of extension of said first holding rods;
brackets or mounts;
connection plates;
an ejector weight located between two rows of said first holding rods, said ejector weight being connected to said brackets or mounts via said connection plates; and
a plurality of second holding rods, said second holding rods having centering tips for precentering the rod-shaped objects.

21. A device for handling essentially rod-shaped objects formed by bars of articles, which are stacked in one another in such a way that they can be separated, the device comprising:
a plurality of first holding rods with essentially hook-like end pieces for extending under the rod-shaped objects, wherein said end pieces can be moved under the objects for releasing the objects via a motion into a plane extending at right angles to a direction of extension of said first holding rods;
brackets or mounts;
connection plates;
an ejector weight located between two rows of said first holding rods, said ejector weight being connected to said brackets or mounts via said connection plates; and
a plurality of second holding rods, wherein said first holding rods and said second holding rods are formed by members, which are placed on one another and said members are braced with one another by a tensioning element extending through said members.

22. A device in accordance with claim 21, wherein said first holding rods are mounted rigidly on one of two mounting plates and said mounting plates are movable in relation to one another, wherein a motion of said mounting plates has at least one component at right angles to rows of said first holding rods.

23. A device in accordance with claim 21, wherein said end pieces have, on an underside thereof, a lead-in bevel projecting toward a free end from an area in which said end pieces are connected to said first holding rods.

24. A device in accordance with claim 21, wherein said end pieces have an essentially wedge-shaped profile at right angles to said first holding rods.

25. A device in accordance with claim 21, wherein said second holding rods have no said hook-like end pieces.

26. A device in accordance with claim 21, wherein said second holding rods taper at an end thereof.

27. A device for handling essentially rod-shaped objects formed by bars of articles, which are stacked in one another in such a way that they can be separated, the device comprising:
a plurality of first holding rods with essentially hook-like end pieces for extending under the rod-shaped objects, said end pieces being able to be moved under the objects for releasing the objects via a motion into a plane extending at right angles to a direction of extension of said first holding rods;
a plurality of second holding rods, wherein each of said first holding rods provided with at least one of said end pieces is surrounded by four of said second holding rods.

28. A device in accordance with claim 27, wherein said at least one of said end pieces can be pivoted out of a contour defined by said second holding rods and into said contour.

29. A device for handling essentially rod-shaped objects formed by bars of articles, which are stacked in one another in such a way that they can be separated, the device comprising:
a plurality of first holding rods having essentially hook-like end pieces for extending under the rod-shaped objects, wherein said end pieces can be moved under the objects, said end pieces being able to be moved under the objects for releasing the objects via a motion into a plane extending at right angles to a direction of extension of said first holding rods;
a plurality of second holding rods, wherein said first holding rods and said second holding rods are formed by members, which are placed on one another and said members are braced with one another by a tensioning element extending through said members.

* * * * *